United States Patent
Zee et al.

(10) Patent No.: US 9,680,722 B2
(45) Date of Patent: Jun. 13, 2017

(54) METHOD FOR DETERMINING A SEVERITY OF A NETWORK INCIDENT

(75) Inventors: Oscar Zee, Stockholm (SE); Tomas Nylander, Värmdö (SE); Dimitrios Pelecanos, Kista (SE); Lars Rymert, Huddinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 673 days.

(21) Appl. No.: 13/876,041

(22) PCT Filed: Jul. 21, 2011

(86) PCT No.: PCT/EP2011/062539
§ 371 (c)(1),
(2), (4) Date: Mar. 26, 2013

(87) PCT Pub. No.: WO2012/041555
PCT Pub. Date: Apr. 5, 2012

(65) Prior Publication Data
US 2013/0176858 A1 Jul. 11, 2013

Related U.S. Application Data

(60) Provisional application No. 61/388,295, filed on Sep. 30, 2010.

(51) Int. Cl.
*H04L 12/26* (2006.01)
*H04L 12/24* (2006.01)
*G06F 15/173* (2006.01)

(52) U.S. Cl.
CPC .......... *H04L 43/08* (2013.01); *H04L 41/0631* (2013.01)

(58) Field of Classification Search
CPC ... H04L 41/06; H04L 41/0654; H04L 41/069; H04L 41/0631

(Continued)

(56) References Cited

U.S. PATENT DOCUMENTS 7,600,007 B1 * 10/2009 Lewis .................. G06Q 10/04
709/223
7,701,843 B1    4/2010 Licari et al.
(Continued)

FOREIGN PATENT DOCUMENTS

CN      101335643 A    12/2008
CN      101374077 A     2/2009
GB        2409297 A     6/2005

OTHER PUBLICATIONS

3rd Generation Partnership Project. 3GPP TS 32.111-1 V9.0.0 (Dec. 2009). 3rd Generation Partnership Project; Technical Specification Group Services and System Aspects; Telecommunication management; Fault Management; Part 1: 3G fault management requirements (Release 9). Dec. 2009, pp. 1-19.

(Continued)

*Primary Examiner* — Charles C Jiang
*Assistant Examiner* — Will Lin
(74) *Attorney, Agent, or Firm* — Murphy, Bilak & Homiller, PLLC

(57) ABSTRACT

The invention relates to a method for determining a severity of a network incident causing a network alarm in a communication network. The method comprises obtaining (201) a severity attribute associated with the network alarm, the severity attribute indicating an impact of the network incident on a communication service in the communication network, and relating (203) the severity attribute to a severity indicator from a predetermined set of severity indicators to determine the severity of the network incident.

20 Claims, 11 Drawing Sheets

(58) Field of Classification Search
USPC ........... 370/241, 242, 328, 338; 709/223
See application file for complete search history.

(56) References Cited

U.S. PATENT DOCUMENTS

| | | | | |
|---|---|---|---|---|
| 8,065,568 | B2* | 11/2011 | Watanabe | H04L 12/2602 702/187 |
| 2001/0013107 | A1 | 8/2001 | Lewis | |
| 2004/0261116 | A1* | 12/2004 | Mckeown | H04L 12/24 725/109 |
| 2005/0271250 | A1* | 12/2005 | Vallone | G06K 9/00288 382/103 |
| 2006/0294214 | A1* | 12/2006 | Chou | H04L 41/0681 709/223 |
| 2007/0222576 | A1* | 9/2007 | Miller | H04L 41/0609 340/506 |
| 2009/0295571 | A1* | 12/2009 | Hosey | G08B 25/08 340/540 |
| 2010/0057901 | A1* | 3/2010 | Ozaki | H04L 12/2697 709/223 |
| 2010/0110900 | A1* | 5/2010 | Kim | H04L 1/24 370/242 |

OTHER PUBLICATIONS

3rd Generation Partnership Project. 3GPP TS 32.121 V9.0.0 (Dec. 2009). 3rd Generation Partnership Project; Technical Specification Group Services and System Aspects; Telecommunication management; Advanced Alarm Management (AAM) Integration Reference Point (IRP) Requirements (Release 9). Dec. 2009, pp. 1-7.

3rd Generation Partnership Project. ETSI TS 132 111-1 V9.0.0 (Feb. 2010). Digital cellular telecommunications system (Phase 2+); Universal Mobile Telecommunications System (UMTS); LTE; Telecommunication management; Fault Management; Part 1: 3G fault management requirements (3GPP TS 32.111-1 version 9.0.0 Release 9). Feb. 2010, pp. 1-22.

3rd Generation Partnership Project. ETSI TS 132 121 V9.0.0 (Feb. 2010). Digital cellular telecommunications system (Phase 2+);Universal Mobile Telecommunications System (UMTS);LTE; Telecommunication management; Advanced Alarm Management (AAM) Integration Reference Point (IRP); Requirements (3GPP TS 32.121 version 9.0.0 Release 9). Feb. 2010, pp. 1-10.

International Telecommunication Union. "Information technology—Open Systems Interconnection—Systems management: Alarm reporting function—Amendment 1: Implementation Conformance Statement Proformas—Technical Corrigedum 1." ITU-T X.733/Amd.1 Corrigendum 1 (Oct. 1996), Telecommunication Standardization Sector of ITU, Series X: Data Networks and Open System Communication, OSI Management, 1996, pp. 1-8.

International Communications Union. "Information Technology—Open Systems Interconnection—Systems Management: Alarm Reporting Function." CCITT X.733, The International Telegraph and Telephone Consultative Committee, Data Communication Networks, Feb. 10, 1992, Geneva, Switzerland.

International Telecommunication Union. "Information technology—Open Systems Interconnection—Systems management: Alarm reporting function—CCITT Recommendation X.733/Corr. 1" ITU-T X.733/Corr.1 (Feb. 1994), Telecommunication Standardization Sector of ITU, Technical Corrigendum 1: Data Communication Networks, 1994, pp. 1-3.

International Telecommunication Union. "Information technology—Open Systems Interconnection—Systems management: Alarm reporting function—Amendment 1: Implementation Conformance Statement Proformas." ITU-T Amendment 1 X.733 (Apr. 1995), Telecommunication Standardization Sector of ITU, Data Networks and Open System Communication, OSI Management, 1995, pp. 1-33.

International Telecommunication Union. "Information technology—Open Systems Interconnection—Systems management: Alarm reporting function—Technical Corrigendum 2." ITU-T X.733 Corrigendum(Mar. 1999), Telecommunication Standardization Sector of ITU, Series X: Data Networks and Open System Communication, OSI Management—Management functions and ODMA functions, 1999, pp. 1-9.

Vodafone, Deutsche Telekom, France Telecom, KPN. "NGMN Operations Requirements." Feb. 11, 2010, Version 1.3, pp. 1-23.

* cited by examiner

METHOD FOR DETERMINING A SEVERITY OF A NETWORK INCIDENT

BACKGROUND

In modern telecommunication networks such as convergence networks, a plurality of entities may be deployed for providing communication services. However, if e.g. a network entity under management is not performing at a service level as expected by a network operator, then a single network incident may result in generation of multiple alarms from affected entities under management and management systems, over space and time. The network operator receiving the generated alarms may be enabled to evaluate the received alarms to determine the impact for the end subscribers on a communication service such as voice, and identify the entity having the network fault. In this regard, rapid and accurate determination of end user impact and faulty entity may shorten the time to repair, reduce operational costs, and facilitate the support of service contracts between operators providing communication services and service consumers.

By studying the WLA (Work Level Agreement) and SLA (Service Level Agreement) between the operator and Managed Service Provider, it may be found out that the judgment on severity of an incident in the network has fundamental differences to the perceived severity an alarm provided by the network element or network entity (NE). The severity of an incident, seen from the operator point of view, is judged by the impact on the delivered services and revenue. Examples of KPI (Key Performance Indicators) used by operator for severity judgment are:
Number of affected subscribers,
Number of affected sites,
The level of disturbance,
The affected communication service,
Type of site affected (golden site, A-site, B-site),
Affecting or non affecting important customers, or
Certain important events in an area like music festival, football etc.

For the perceived severity on an alarm, in ITU-T X.733 chapter 8.1.2.3, which 3GPP fault management standard TS 32.111-1 is referred to, the perceived severity is divided into 6 different categories: cleared, indeterminate, critical, major, minor and warning. Only two of the categories, critical and major, indicate a service affecting condition has developed. Unfortunately, there is no information on the quantity of the service is affected on the network.

The current 3GPP standard TS 32.121 states that the IRP Manager (Network Management System) should be able to request the IRP Agent (Domain Manager) to categorize the alarm with rules. These rules may depend for example on the type of alarm, the environment, the time of day, the type of network element, the alarm severity, the location, position in the containment tree etc. However, this approach of categorization of alarm requires detailed knowledge of the network element, how the elements are structured in between (position in the containment tree) and also knowledge of the alarms (type of alarm, alarm severity).

Due to lack of quantification of the affected service, it is difficult to make an automatic judgment of severity based on the network impact as described in the WLA/S LA.

SUMMARY

It is the object of the invention to provide a concept for efficiently determining a severity of a network incident affecting a communication service such as voice service. This object is achieved by the features of the independent claims. Further embodiments are apparent from the dependent claims, the description and the accompanying drawings.

The invention is based on the finding that a network incident may efficiently be handled when a severity of a network incident causing a network alarm is determined. In particular, the incident may consist of a number of correlated alarms, i.e. alarms which relate to the same network incident such as network entity failure. Upon the basis of one or more correlated alarms, an impact of the network incident on a communication service such as voice or multimedia, may be determined.

The invention provides a method and a corresponding mechanism to automatically determine the severity of an incident which consists or which may consist of a number of correlated alarms based on the impact on the delivered service.

According to a first aspect, the invention relates to a method for determining a severity of a network incident causing a network alarm in a communication network, the method comprising the steps of obtaining a severity attribute associated with the network alarm, the severity attribute indicating an impact of the network incident on a communication service in the communication network, and relating the severity attribute to a severity indicator from a predetermined set of severity indicators to determine the severity of the network incident.

According to an embodiment, the severity attribute indicates at least one of: a number of subscribers affected by the network incident, a type of a subscriber affected by the network incident, a number of network cells affected by the network incident, a number of communication sites affected by the network incident, a communication service, in particular a voice service or a packet data service, affected by the network incident, a degradation of a communication service, in particular of a voice service or of a packet data service, due to the network incident, an importance of a communication service affected by the network incident, a type of a communication service affected by the network incident, a duration of a disturbance caused by the network incident, a duration of the network incident, a remaining time until an occurrence of a disturbance caused by the network incident, and a remaining number of redundant communication resources which are available until an occurrence of a disturbance caused by the network incident.

According to an embodiment, the predetermined set of severity indicators comprises at least one of the following severity indicators: major service outage, critical, major, minor, and non service affecting. By way of example, the predetermined set of severity indicators may be prestored in a storage as e.g. severity tags or severity numbers each of which being associated with a certain severity indicator.

According to an embodiment, the obtaining the severity attribute comprises receiving the network alarm together with the attribute over the communication network. Thereby, a "bottom-up" approach may be realized according to which a network element or a network node may provide information on a network impact when an alarm is issued toward when an alarm is issued towards an operating system which may, by way of example, perform an analysis of the network impact upon the basis of the provided information.

According to an embodiment, the obtaining the severity attribute comprises receiving network information relating to an impact of the network alarm on the communication service, in particular a network alarm type, the network information enabling to determine the severity attribute, and determining the severity attribute upon the basis of the received network information.

By way of example, the network or alarm type information may be the information which is used for determine or calculate the severity attributes when an network alarm arrives e.g. at a domain manager. It may indicate e.g. a network address of storage storing the severity attributes, an association of the configurations, managed object class/ instances attribute in the alarm instance, traffic data associated to the managed object/class for the alarm etc.

According to an embodiment, the incident causes a number of correlated network alarms, and wherein the method comprises the steps of correlating a plurality of network alarms with respect to the network incident to determine the number of correlated network alarms, obtaining a number of severity attributes for the number of network alarms, and relating the number of severity attributes to at least one severity indicator from the predetermined set of severity indicators to determine the severity of the network incident.

According to an embodiment, the relating the number of severity attributes to the at least one severity indicator comprises the steps of cumulating the number of severity attributes and relating the cumulated number of severity attributes to the at least one severity indicator, or relating a maximum severity attribute among the number of the severity attributes to the at least one severity indicator.

According to an aspect, the invention relates to a method for characterizing a network incident indicated by a network alarm in a communication network, the method comprising the steps of obtaining network information relating to an impact of the network alarm on a communication service to characterize the network incident, and transmitting the network information over the communication network.

According to an embodiment, the network information indicates a network alarm type enabling to determine a severity attribute, the severity attribute characterizing the network incident.

According to an embodiment, the network information is transmitted together with the network alarm towards the communication network, in particular towards a domain manager.

According to an embodiment, the method comprises transmitting the alarm model during an initial phase, and the network alarm during an operational phase therewith over a communication network, in particular towards a domain manager. Thereby, the aforementioned top-down approach may be realized.

According to an embodiment, the method comprises transmitting the network alarm and the severity indicator associated therewith over a communication network, in particular towards a domain manager. Thereby, the aforementioned bottom-up approach may be realized.

According to an embodiment, the incident causes a number of correlated network alarms, and wherein the method further comprises the steps of correlating network alarms to determine the number of correlated network alarms, analyzing an impact of the network incident as indicated by the number of correlated network alarms on the communication service to obtain a number of severity attributes, and associating the number of correlated network alarms with a severity indicator.

According to a further aspect, the invention relates to a network entity, in particular a domain manager, for determining a severity of a network incident causing a network alarm or a plurality of network alarms in a communication network, the network entity being configured to perform any of the methods described herein. By way of example, the network entity may be a domain manager.

According to an embodiment, the network entity comprises a receiver for receiving the network alarm together with the severity attribute, and a processor for relating the severity attribute to a severity indicator from a predetermined set of severity indicators to determine the severity of the network incident. Thereby, the bottom-up approach may be realized.

According to an embodiment, the network entity comprises a receiver for receiving network information relating to an impact of the network alarm on the communication service, in particular a network alarm type, the network information enabling to determine a severity attribute, the severity attribute indicating an impact of the network incident on a communication service in the communication network, and a processor for determining the severity attribute upon the basis of the received network information. Thereby, the top-down approach may be realized.

According to a further aspect, the invention relates to a network entity, in particular a radio network controller or a Node B or a base station, for characterizing a network incident indicated by a network alarm in a communication network, the network entity being configured to perform any of the methods described herein.

According to an embodiment, the invention relates to a network entity, comprising a processor for analyzing an impact of the network incident as indicated by the network alarm on a communication service to obtain a severity attribute.

According to an embodiment, the invention relates to a network entity, comprising a transmitter for transmitting network information relating to an impact of the network alarm on a communication service over the communication network.

According to an embodiment, the invention relates to a network entity, comprising a transmitter for transmitting the network alarm together with the severity attribute associated therewith towards the communication network, in particular towards a network entity as described herein.

BRIEF DESCRIPTION OF THE DRAWINGS

Further embodiments may be described with respect to the following Figures, in which.

DETAILED DESCRIPTION OF EMBODIMENTS

Figure 1:
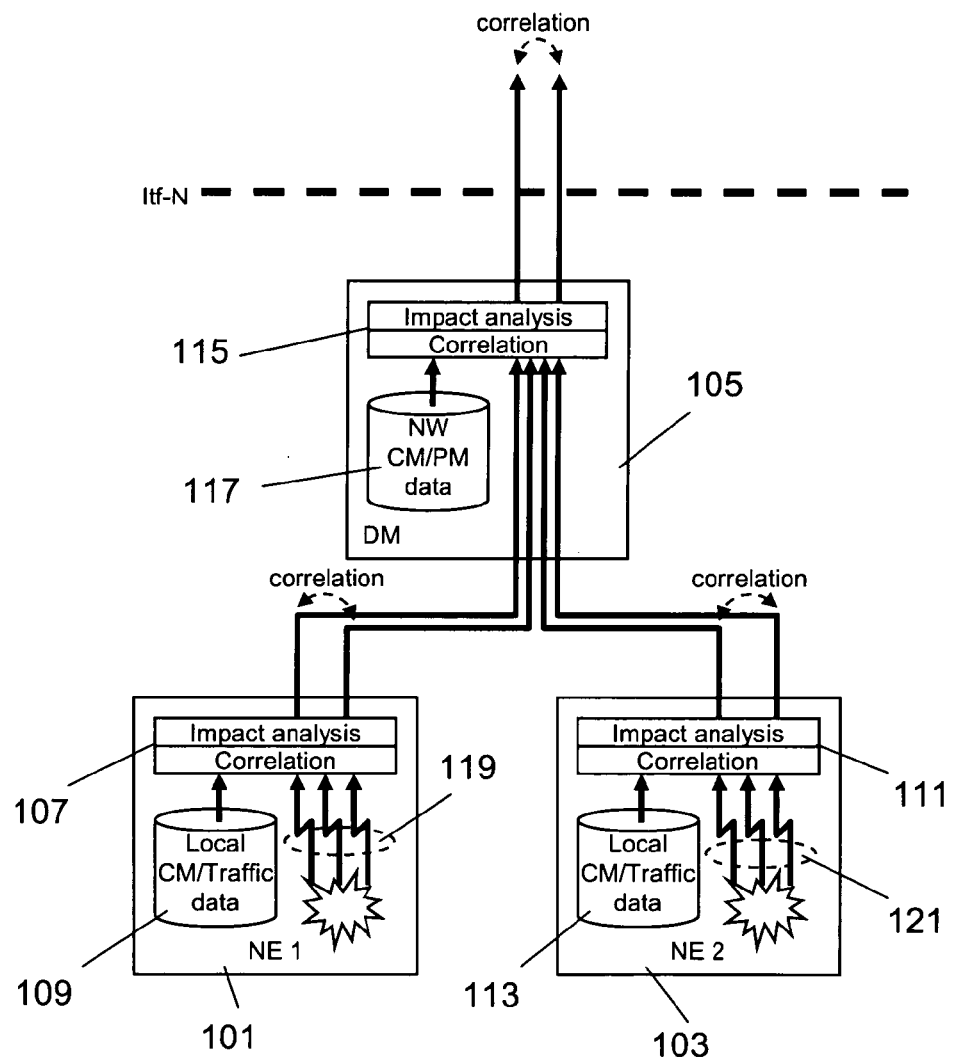
FIG. 1 shows an arrangement of network entities.

FIG. 1 shows an arrangement of network entities comprising a first network entity 101, a second network entity 103 and a third network entity 105. The first and second network entities 101, 103 may respectively form a radio network controller (RNC) or a NodeB. The third network entity 105 may form e.g. a domain manager (DM) which receives alarms, e.g. correlated alarms from the first and second network entity 101 and 103.

The first network entity 101 may comprise a processor 107 and a storage 109. Correspondingly, the second network entity comprises a processor 111 and a storage 113. Furthermore, the third network entity 105 comprises a processor 115 and a storage 117.

Upon network incident, the first network entity 101 may correlate node alarms 119 in order to determine correlated alarms relating to the same network incident. In this regard, the processor 107 may be configured to perform alarm correlation using e.g. local content management (CM) data or traffic data. Upon the basis of the correlated alarms, the processor 107 may perform an impact analysis in order to determine an impact of the network incident on a communication service such as e.g. voice or streaming media service. The correlated alarms may be provided to the third network entity 105 for further processing. The second network entity 103 may correspondingly handle a plurality of node alarms 121 as described with respect to the first network entity 101.

The correlated alarms are provided to the third network entity 105 which may, by means of the processor 115, further correlate the received correlated alarms using e.g. a network (NW) CM or PM data. Thereafter, the processor 115 may perform an impact analysis in order to determine an impact of the incident on a communication service. The third network entity 105 may further transmit the correlated alarms via the Itf-N interface as depicted in FIG. 1.

According to some embodiments, the network entities (NE) 101, 103 may provide information on the network impact rather than information on the node impact for each alarm, since the information on the node impact requires expertise knowledge on the correlations between alarms on both NE level and network level, which is difficult to achieve as only preserved severity is provided on the alarm instances. Therefore, two possible realizations may be considered:

According to the top down approach, the NE 101, 103 may provide an alarm model on what each alarm may impact the functionality on the system, and information on what functionality may impact the network to a domain manager 105 such as OSS-RC (Operation and Support System Radio and Core). When an NE alarm occurs then the domain manager 105 may beside gathering alarms from different NEs 101, 103 to incident folders, also perform a deep analysis of the network impact, based on the alarm model provided by the NE 101, 103 and network configuration information. An example of alarm model is e.g. an alarm on a baseband module in the NE 101, 103 which may impact a number of common channels with 100%, and each common channel malfunction may impact traffic for one cell on the network.

According to the top down approach, which is depicted in FIG. 1, each or a NE 101, 103 in the network may provide information on network impact when an alarm is issued and sent it to the DM 105 in particular during an initial state (e.g. before the network entity is put into operation. The DM 105 may in this case beside gathering alarms from different NEs 101, 103 to incident folders perform an analysis of a network impact by adding the network impact, depending on the configuration information, and/or traffic data.

In the following, without loss of generality any by way of example only, the bottom up approach will be described in more detail.

Figure 2:
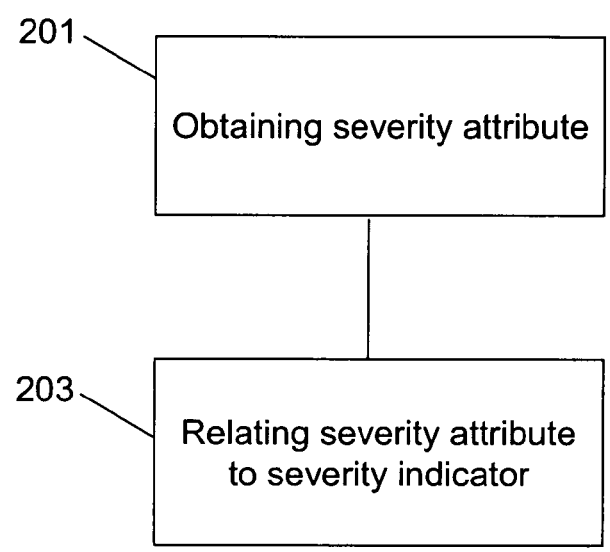
FIG. 2 shows a diagram of a method for determining a severity of a network incident.

FIG. 2 shows a diagram of a method for determining a severity of a network incident causing a network alarm in a communication network. The method comprises obtaining 201 a severity attribute associated with the network alarm. The severity attribute may indicate an impact of the network incident on a communication service in the communication network. The method shown in FIG. 2 may be performed by any of the network entities shown in FIG. 1.

Figure 3:
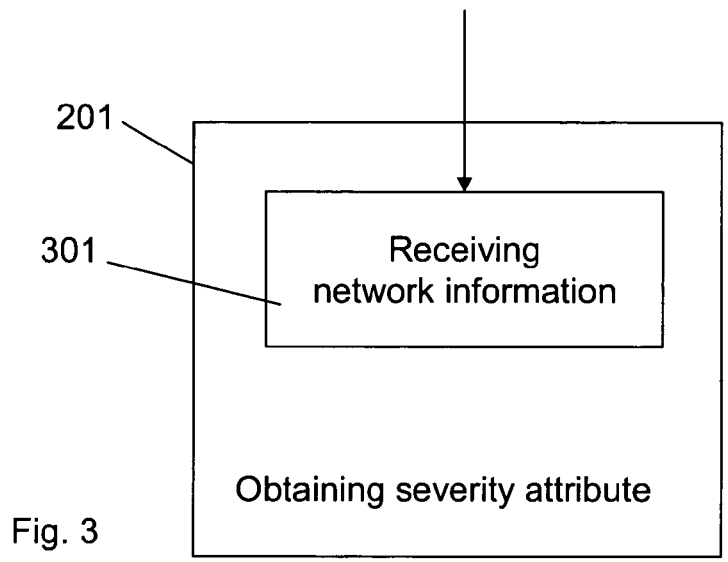
FIG. 3 shows an embodiment of the step of obtaining a severity attribute.

FIG. 3 shows an embodiment of the step of obtaining 201 the severity attribute as shown in FIG. 2. The method comprises receiving 301 a network alarm and a severity attribute. By way of example, the network alarm and the severity attribute may be received together and simultaneously by e.g. a domain manager forming an embodiment of a network entity. However, the network alarm and the severity attribute may be received at different time instance by the domain manager.

Figure 4:
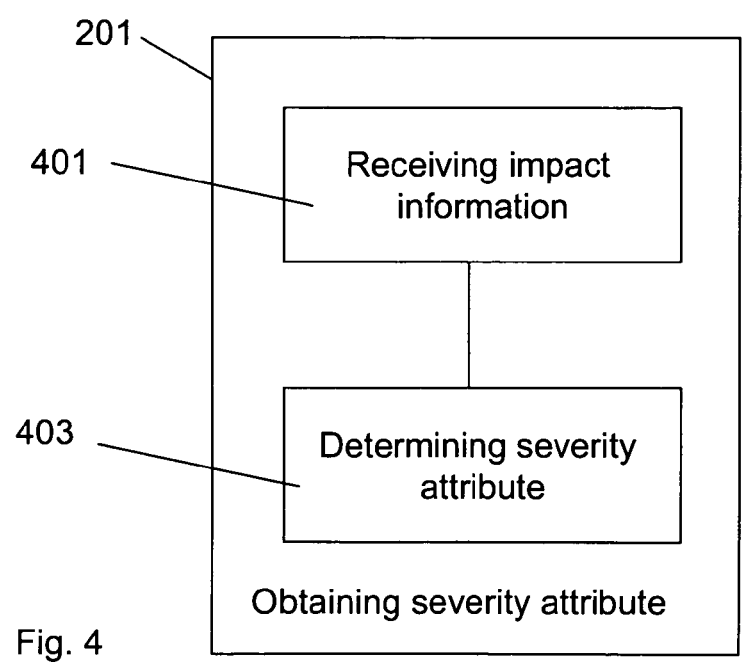
FIG. 4 shows an embodiment of the step of obtaining a severity attribute.

FIG. 4 shows another embodiment of the step of obtaining 201 a severity attribute which may comprise the step receiving 401 network information relating to an impact of the network alarm on the communication service, in particular a network alarm type, the network information enabling to determine the severity attribute, and determining 403 the severity attribute upon the basis of the received network information.

Figure 5:
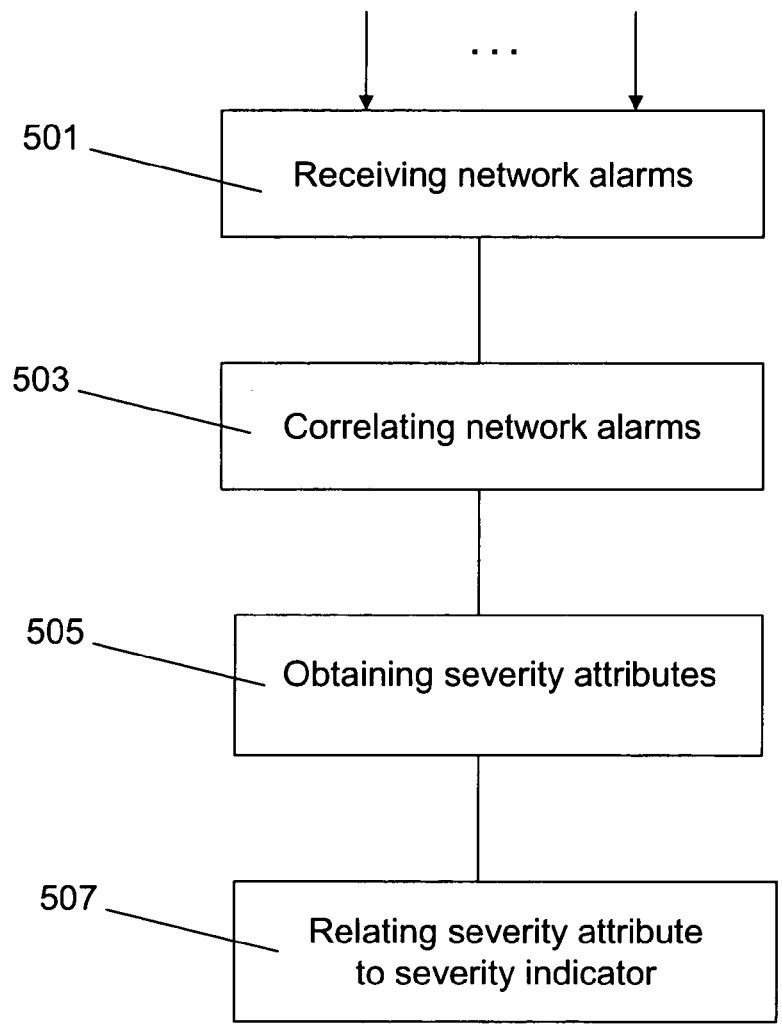
FIG. 5 shows a diagram of a method for determining a severity of a network incident.

The steps shown in FIGS. 4 and 5 may be performed by any of the network entities shown in FIG. 1. In this regard, the embodiment shown in FIG. 3 may relate to the aforementioned bottom-up approach.

According to some embodiments, a network incident may cause a number, e.g. two or more than two, of correlated network alarms. FIG. 5 shows a diagram of a corresponding method for determining a severity of a network incident causing the number of correlated network alarms. The diagram depicted in FIG. 5 may be understood as an enhancement of the method depicted in FIG. 2. The method comprises receiving 501 the network alarm by e.g. a domain manager. The method further comprises correlating 503 the network alarms with respect to the network incident in order to determine the number of correlated network alarms. The method further comprises obtaining 505 a number of severity attributes for the number of network alarms according to the principles described herein. Furthermore, the method comprises relating 507 the number of severity attributes to at least one severity indicator from a predetermined set of severity indicators in order to determine the severity of the network incident according to the principles described herein.

Figure 6A:
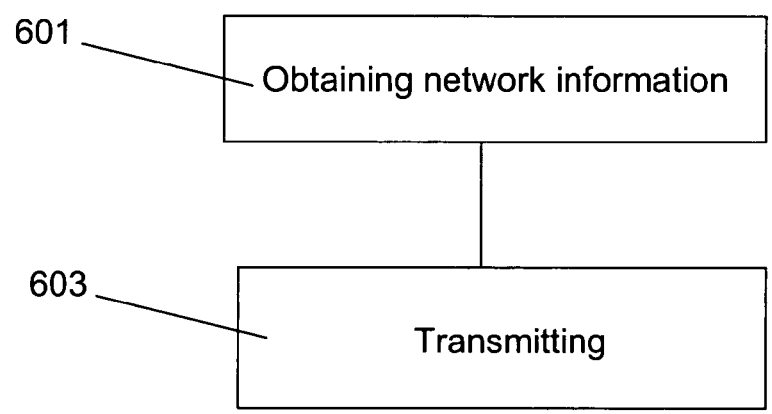
FIGS. 6a, 6b, 6c show method steps for characterizing a network incident.

The Step 505 may comprise the step of receiving impact information indicating an impact of the network incident on a communication service, and the step of determining the severity attribute upon the basis of the received impact information. The step of determining may comprise analyzing an impact of the network incident upon the basis of the received impact information According to some embodiments, the severity attribute may be obtained upon a basis of an analysis of an impact of the network alarm on a communication service. Furthermore, the network incident may be characterized in DM upon the basis of the network alarm and the severity attribute. In this regard, FIG. 6a shows a method comprising obtaining 601 network information relating to an impact of the network alarm on a communication service to characterize the network incident, and transmitting 603 the network information over the communication network.

Figure 6B:
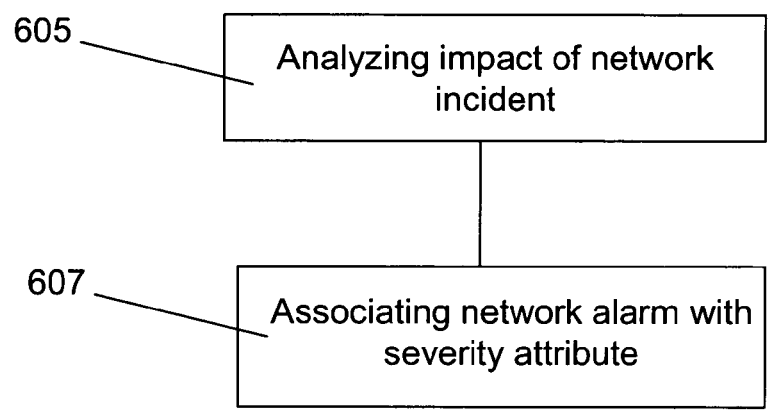

Further, optional, method steps as shown in FIG. 6b may comprise analyzing 605 an impact of the network incident on the communication service, and associating 607 the network alarm with the severity attribute. The aforementioned steps may be performed by any of the network entities 101, 103 shown in FIG. 1.

According to some embodiments, the method may comprise transmitting 605 impact information indicating the impact of the network incident as indicated by the network alarm over the communication network towards e.g. a domain manager. Thereby, the aforementioned top-down approach may be realized.

Alternatively, the method may comprise transmitting 605 the network alarm and the severity indicator associated with over the communication towards e.g. a domain manager. Thereby, the bottom-up approach may be realized.

A further alternative is that the method may comprise transmitting 607 the network alarm and severity attributes associated with over the communication towards e.g. a domain manager. Thereby, the bottom-up approach may be realized, too.

Figure 6C:
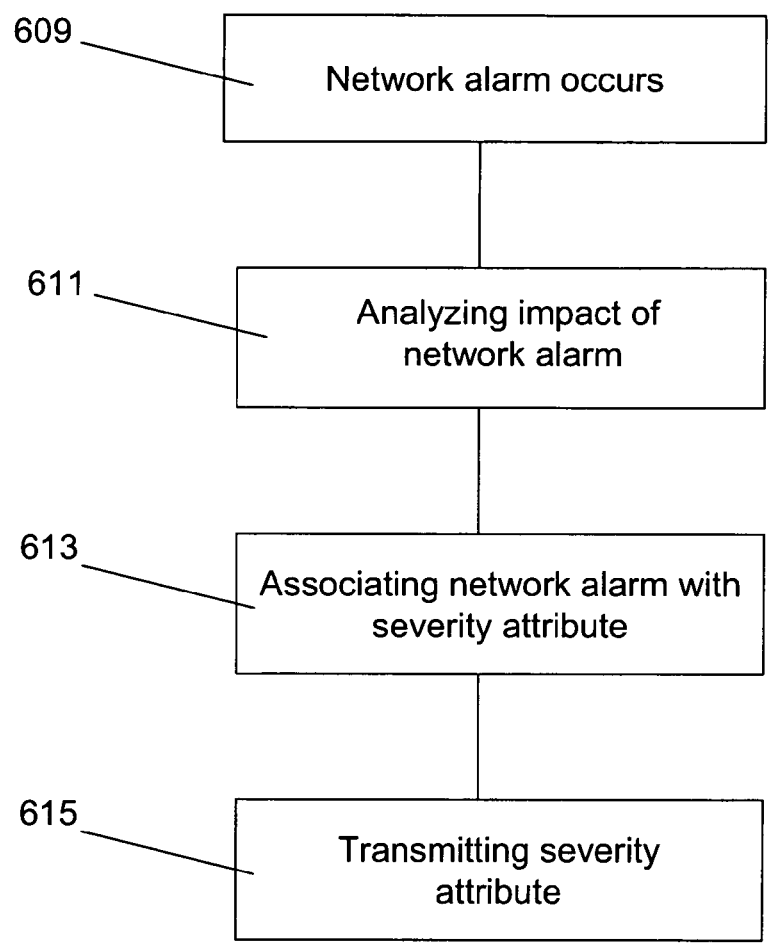

According to some embodiments, the method may be performed as shown in FIG. 6c. After an occurrence 609 of a network alarm, in step 611, an impact of network alarm to obtain severity attribute to the alarm is analyzed. Thereafter, in an optional step 613, the network alarm may be associated with the severity attribute. Thereafter, the severity attribute may be transmitted in step 615.

Figure 7:
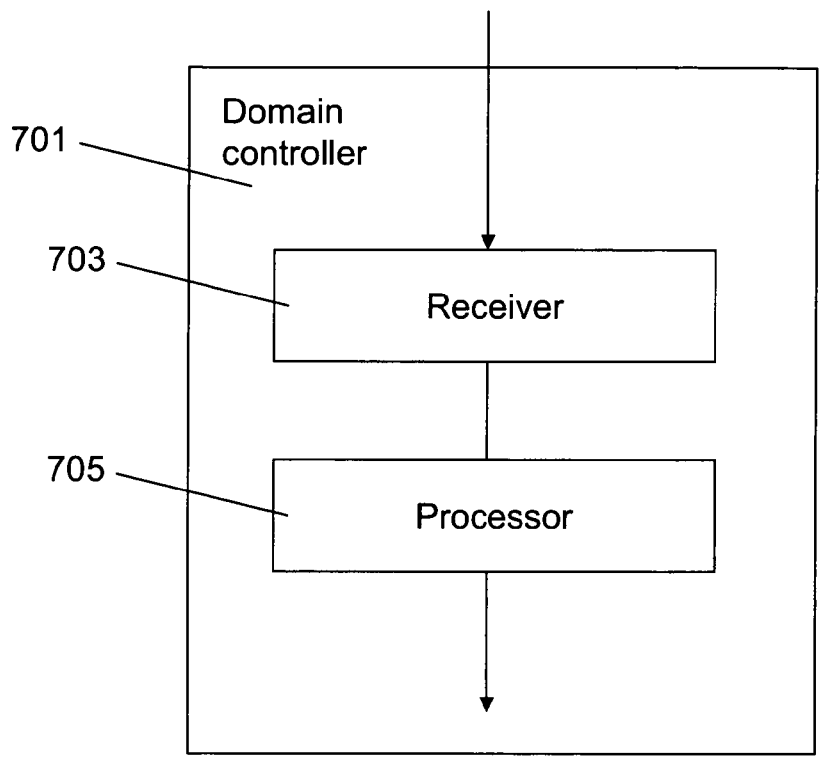
FIG. 7 shows an embodiment of a network entity.

FIG. 7 shows an embodiment of a network entity, e.g. of a domain manager for determining a severity of a network incident causing a network alarm in a communication network.

The network entity may comprise a receiver 703 for receiving the network alarm together with the severity attribute, and a processor 705 for relating the severity attribute to a severity indicator from a predetermined set of severity indicators to determine the severity of the network incident according to the principles described herein. Thereby, the aforementioned bottom-up approach may be realized.

Additionally or alternatively, the receiver may be configured to receive alarm model during initial state from the NE:s. Correspondingly, the processor 705 may be configured to determine the severity attribute upon the basis of the received alarm model, configuration information and Performance data received from the NE.s, and relating the severity attribute to at least one severity indicator from a predetermined set of severity indicators to determine the severity of the network incident. Thereby, the top-down approach may be realized.

Figure 8:
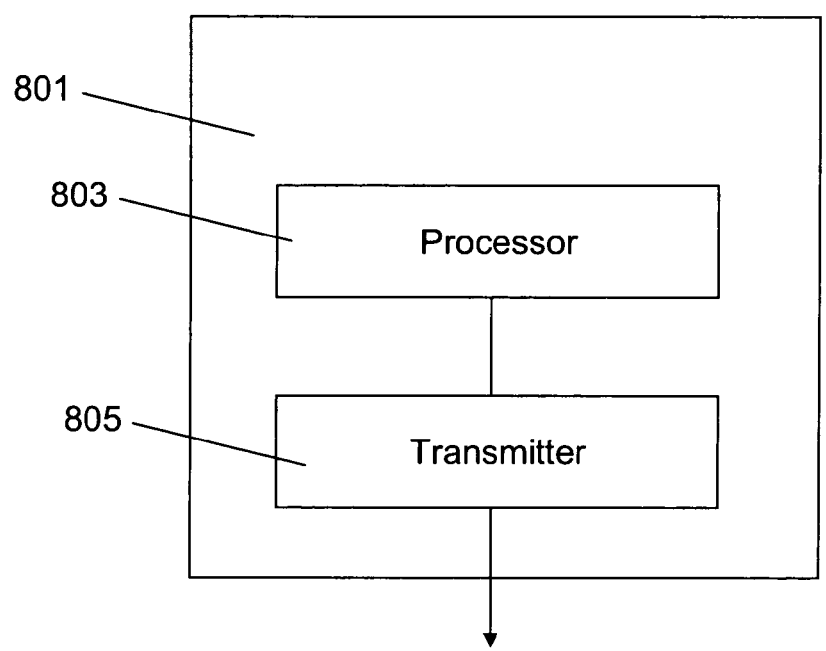
FIG. 8 shows a block diagram of a network entity.

FIG. 8 shows a block diagram of a network entity, e.g. of a radio network controller or a NodeB (base station), for characterizing a network incident indicated by a network alarm in a communication network. The network entity shown in FIG. 8 may correspond to one of the network entities 101, 103 depicted in FIG. 1. The network entity comprises a processor 803 for analyzing an impact of the network alarm on a communication service, e.g. voice or multimedia, to obtain a severity attribute, and for associating the network alarm with the severity attribute in order to characterize the network incident. This is a realization of the top-down approach.

The network entity may further comprise a transmitter 805 for transmitting network information relating to an impact of the network alarm on a communication service over the communication network. According to some embodiments, the transmitter 805 may transmit the alarm model during an initial phase, and the network alarm during operational phase therewith over a communication. This is a realization of the bottom-up approach.

Alternatively or additionally, the transmitter may be configured to transmit the network alarm together with the severity attribute associated towards the communication network, e.g. towards the domain manager 105 as depicted in FIG. 2 or as depicted in FIG. 7.

a transmitter 805 for transmitting network information relating to an impact of the network alarm on a communication service over the communication network. With reference to the above-described embodiments, in a first step, e.g. an end user defined incident severity definition, based on the impact on the delivered service, may be introduced. The incident severity definition may comprise a set of severity indicators which may be realized as number of records, where each record describes the criteria for each incident severity. Examples of severity indicators are:

Major Service Outage (MSO),
Critical,
Major,
Minor, and
Non Service Affecting.

The criteria may comprise a number of attributes describing the service impact on the network. Examples of criteria attributes are:

Number of affected subscriber,
Number of affected cells,
Number of affected sites,
Affected service such as voice or packet data),
Degradation of service such as percentage of failed call setup,
Duration time of the disturbance,
Remaining time until disturbance occurs, e.g. in case of mains failure, how long time the battery may last,
Remaining redundant resource left before disturbance occurs, e.g. in case one of total three redundant communication links is down, this attribute may report 2, Beside the above criteria attributes, there may also be exceptions which may have impact on the prioritization, e.g. golden sites, ongoing projects on certain sites, special event with time and place, etc. But since these exceptions attributes may have quite high change frequency, they are not suitable to be included in the severity definition rather than in an separate "exceptions severity definitions".

In step 2, in the NE 101, 103, the node alarms may be correlated and, if possible, suppressed in order to facilitate the DM 105 to group them together.

In step 3, after the NE 101, 103 has correlated the alarms, it may also analyze the impact of the correlated alarms, based on the definition of criteria attributes mentioned in bullet 1 above. For this analysis, NE 101, 103 may beside the alarms also use the locally available information, e.g. node configuration information, traffic data etc. The result of the impact analysis may be sent as new attributes e.g. number of affected subscribers, number of affected cells, etc. in the correlated alarms.

In step 4, when the DM 105 has received the node alarms from the NEs 101, 103, it may further correlate the related node alarms between NEs 101, 103 into incidents in order to simplify the alarm handling effort.

In step 5, in the DM 105, after correlation of node alarm to incidents, it may be able to analyze the impact of each incident, using the new attributes provided by the correlated alarms in the incidents, plus other information available on the DM 105, e.g. network configuration information, Performance Management (traffic KPI) data, alarm history etc. The result of this impact analysis can now be used for the judgment of severity of this incident by comparing the result with incident severity definition.

In case of the incident severity judgment is done above Itf-N, i.e. in the Network Management System (NMS), the DM 105 may transmit the result of impact analysis as new attributes in the correlated alarms (=incident).

In case of the incident severity judgment is performed below the Itf-N, i.e. within the DM 105, end user may submit the incident severity definition through the Itf-N interface to the DM 105.

In step 6, it is also possible to repeat steps 4 and 5 on an NMS level in order to correlate and analyze the impact of an incident between different domains.

With reference to incident severity criteria attributes, as afore mentioned, severity criteria attributes may be the key for unification of impact analysis for all network elements. According to some embodiments, the number of attributes may be kept down for configuration simplicity by the end user.

According to some embodiments, the severity attributes may be identified as follows:
- Select a number of alarm entities from the alarm list, and determine what kind of severity attributes can be reported from each of them, and
- Summarize all the collected attributes from the previous step and derive the service impact attributes in severity definition.

According to an embodiment, one of the two RNC Northbound interfaces may be down which is associated with loss of redundancy. The Northbound interface is configured as master/slave
Current
Impacted subscribers=0, no impact since there is master/slave redundancy
Impacted cells=0
Impacted sites=0
Impacted service=none
Degradation of service=0% which may depend on a master/slave configuration, in case of load balancing, the degradation may be calculated by using local traffic data
Duration of disturbance=0 (same comment as previous attribute)
Remaining redundant resource before disturbance occurs=1
Potential
Impacted subscribers=10000, which may be derived from the local traffic data
Impacted cells=350 which may be derived from local configuration data
Impacted sites=1, wherein only the RNC site may be impacted in case of site visit)
Impacted service=voice and/or data, which may depend on the configuration towards CN
Degradation of service=100%
Duration of disturbance=infinit According to another embodiment, a mains alarm in a RBS, e.g. with backup battery on site, may occur
Current
Impacted subscribers=0, no impact since there is a battery backup
Impacted cells=0
Impacted sites=0
Impacted service=none
Degradation of service=0%
Duration of disturbance=0
Remaining time before disturbance occurs=2 hours, depending on the remaining charge
Potential
Impacted subscribers=160 which may be derived from the local traffic data
Impacted cells=6 which may be derived from local configuration data
Impacted sites=1, wherein only the RBS site may be impacted impact in case of site visit
Impacted service=voice and data
Degradation of service=100%
Duration of disturbance=infinit According to another embodiment, a RNC communication error on Iub with no redundancy may occur
Current
Impacted subscribers=32, which may be derived from the node traffic data, otherwise unknown
Impacted cells=6. which may be derived from the node traffic data, otherwise unknown
Impacted sites=1, e.g. either RNC or RBS site
Impacted service=all or unknown
Degradation of service=100% or unknown
Duration of disturbance=infinit or unknown
Potential
Not applicable According to another embodiment, RBS Baseband board may restart (without redundancy)
Current
Impacted subscribers=32 which may be derived from the node traffic data
Impacted cells=6 which may be derived from the from local configuration data
Impacted sites=1, e.g. RBS site
Impacted service=all
Degradation of service=100%
Duration of disturbance=1 minute (restart time)
Potential
Not applicable After the analysis of the above examples, a first draft of service impact attributes in severity definition is derived below:
Current
Impacted subscribers
Impacted cells
Impacted sites
Impacted service
Degradation of service
Duration of disturbance
Remaining redundant resource before disturbance occurs
Remaining time before disturbance occurs
Potential
Impacted subscribers
Impacted cells
Impacted sites
Impacted service
Degradation of service
Duration of disturbance According to some embodiments, the attributes in "Exception Severity definitions" like golden site locations, ongoing projects on certain sites, special event with time and place, etc may not be included in the list above.

According to some embodiments relating to an automation mechanism, in order to clarify how the incident folder automation is executed in real life, a close-to-reality example may be used for illustration. The steps described in the following are based on the distributed architecture shown e.g. in FIG. 1.

According to some embodiments, pre-requisite may be performed. By way of example, in a WCDMA system, an ET board with identity "ET003", on a network entity such RNC with identity "RNC005" may be broken. This ET board may be connected to 50 NodeBs, each NodeB consiststing of 3 cells. No redundancy connections towards these eNodeBs are configured.

The goal of the automation is to create an incident folder on the DM 105, with name <Root cause Node Name>_<Impact>_<Root cause hardware>, with additional attributes priority and impact filled in. For this particular example, the name of the incident folder may be RNC005_50NodeB_ET003

In step 1, an incident severity may be defined. The attributes on incident severity definition may correspond to the above-described attributes. For e.g. a critical alarm, the following criteria may be fulfilled:
Current
Impacted subscribers: (don't care)
Impacted cells: (don't care)
Impacted sites: >=30
Impacted service: (don't care)
Degradation of service: (don't care)
Duration of disturbance: (don't care)
Remaining redundant resource before disturbance occurs=0
Remaining time before disturbance occurs=0
Potential
Impacted subscribers: (don't care)
Impacted cells: (don't care)
Impacted sites: (don't care)
Impacted service: (don't care)
Degradation of service: (don't care)
Duration of disturbance: (don't care)
    The Dm 105 may implement this mechanism.
    In step 2, an alarm correlation within the NE 101, 103 may be performed.
    The expect alarms from respective NEs 101, 103 from the current implementation may be the following:
RNC (RNC005)
1. Ethernet Switch Port Fault; Comm; LINK_FAILURE; Major; EthernetSwitchModulePort
2. Ethernet Switch Port Fault; Comm; LINK_FAILURE; Major; EthernetSwitchPort
3. ET IP Hardware Fault; Eq; LINE_CARD_PROBLEM; Major; ExchangeTerminalIp
4. Plug-In Unit HW Failure; Eq; REPLACEABLE_UNIT_PROBLEM; Major; PlugInUnit
RBS (50 NEs)
1. Remote IP Address Unreachable; COMMUNICATIONS_ALARM; UNAVAILABLE; MINOR; Sctp
    According to some embodiments, the RNC alarms 1-3 may be suppressed and 4 (total 1 alarm) may be visible, and RBS alarm 1 (50 alarms) may be visible.
    In step 3, an alarm impact analysis may be performed within the NE 101, 103 For RNC005, additional attribute on impact may be assigned by the RNC on alarm 4.
Current
Impacted subscribers=x (fetched from current traffic information within RNC)
Impacted cells=150 (fetch from the cell configuration data connected to the ET board within RNC)
Impacted sites=50 (based on the transport network configuration data connected to the ET board within RNC)
Impacted service=all (based on the resource service configuration data connected to the ET board with RNC)
Degradation of service=100% (since it is a total broken link)
Duration of disturbance=infinite (since it is a total broken link)
Remaining redundant resource before disturbance occurs=0 (since it is a total broken link with no redundancy)
Remaining time before disturbance occurs=0 (since it is a total broken link)
Potential (Not applicable)
etc.
    For all the RBSs—in alarm 1, additional attribute on impact may be set in this step. In order to fill in these new attributes,
Current
Impacted subscribers=x (fetched from current traffic information within RBS)
Impacted cells=3 (fetch from the cell configuration data connected to the IP address within RBS)
Impacted sites=1 (always equal to 1)
Impacted service=all (based on the resource service configuration data connected to the IP address)
Degradation of service=100% (since it is a total broken link)
Duration of disturbance=infinite (since it is a total broken link)
Remaining redundant resource before disturbance occurs=0 (since it is a total broken IP destination)
Remaining time before disturbance occurs=0 (since it is a total broken IP destination)
Potential (Not applicable) etc.
    In step 4, an alarm correlation may be performed on the DM 105. In particular, alarms from RNC and RBSs from previous may be collected into one incident folder. The DM 105 may perform the following actions:
    Correlation of the alarm entries between RNC and RBS,
    Correlation of the IP addresses configuration information between RNC/RBS
    After this step, the incident folder can be created but not all the attributes are filled in, the <Root cause Node Name> and <Root cause hardware> part of the incident slogan can now be filled in. In this embodiment, the name of incident folder will be RNC005_<Impact>_ET003.
    The correlation rules between alarm entries between node types need to be created and implemented on OSS level.
    The correlation on IP address configuration can be based on network configuration stored in the DM 105.
    In step 5, an alarm impact analysis on the DM 105 may be performed. In the incident folder, the impact attributes and the priority attribute will be filled in by using the 1 RNC+50 RBS alarms in the folder.
Impact attributes
Current
Impacted subscribers=x (use the attribute from RNC alarm)
Impacted cells=150 (use the attribute from RNC alarm)
Impacted sites=50 (use the attribute from RNC alarm)
Impacted service=all (use the attribute from RNC alarm)
Degradation of service=100% (use the attribute from RNC alarm)
Duration of disturbance=infinite (use the attribute from RNC alarm)
Remaining redundant resource before disturbance occurs=0 (use the attribute from RNC alarm)
Remaining time before disturbance occurs=0 (use the attribute from RNC alarm)
Potential (Not applicable) etc.
    Priority attribute: Critical (By looking up the "severity definition" defined in step 1, where Impacted sites >=30.

After this step, the full name of the incident and attributes may be filled in, i.e. Incident name="RNC005_50 RBS down_ET003" with severity="critical" and Impact="50 RBS down".

This mechanism may be implemented in the DM 105, by way of example.

Figure 9:
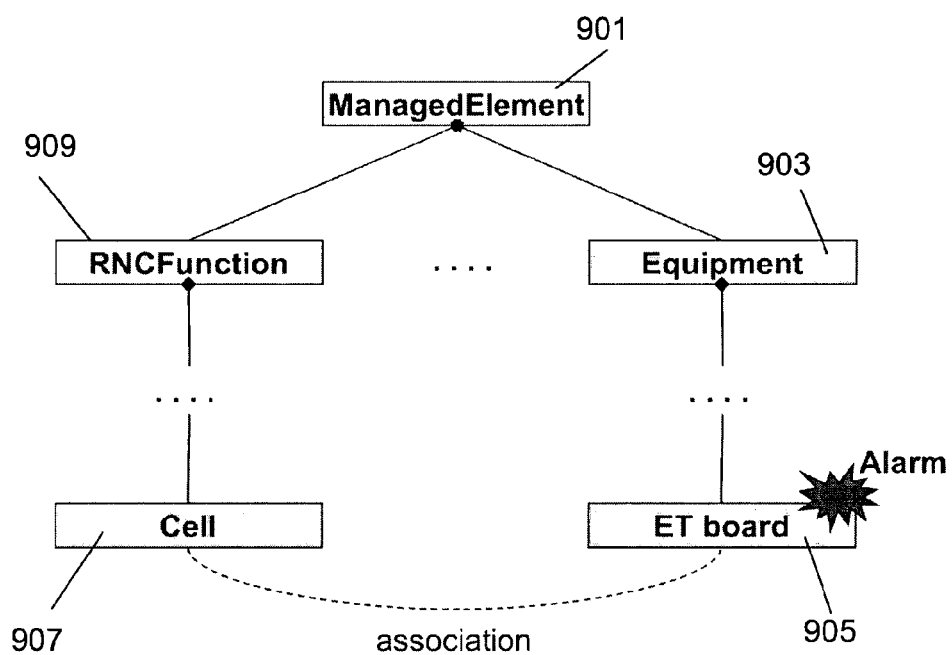
FIG. 9 shows an association between a functional model and equipment model within a network entity.

FIG. 9 shows an association between a functional modal and equipment modal within a network entity. The functional modal comprises a managed element 901, equipment 903, ET board 905, a cell 907 and a RNC function 909. The elements shown in FIG. 9 may be functionally associated with each other as depicted in FIG. 9. By way of example, FIG. 9 summarizes the above attributes which may be derived from the internal configuration data and performance data structure, since there are associations between the hardware model and the functional model within the node.

According to an embodiment, incident folder automation may be performed. In this regard, the following actions may be performed: automatically grouping the alarms into incidents, judging the impact of the incident, and prioritize the incident.

The deployment case of the automated version of incident folder may be as follows:

Before the automation mechanism is activated, the operator needs to configure the system with their own prioritization matrix data, describing what impact on the network for an incident shall be treated as Critical, Major, Minor, and Non-service affected etc. This configuration may be as generic as possible, i.e. no specific knowledge on the alarm entities, or specific hardware or software characteristic on the network elements is needed.

During operation, the operator receives a number of incident folders on the alarm list view, with impact and priority attributes filled in by the system.

One of the effects of this automation is the alarm filtering on OSS can more or less be omitted, since the end user will use the incidents as overview, and the root cause analysis will be digging into the corresponding alarms in the incident folder, which will make root cause analysis much efficient since all the alarms on the incident is now collected in the same incident folder, instead of drilling down to different network elements to find the related alarms.

Figure 10:
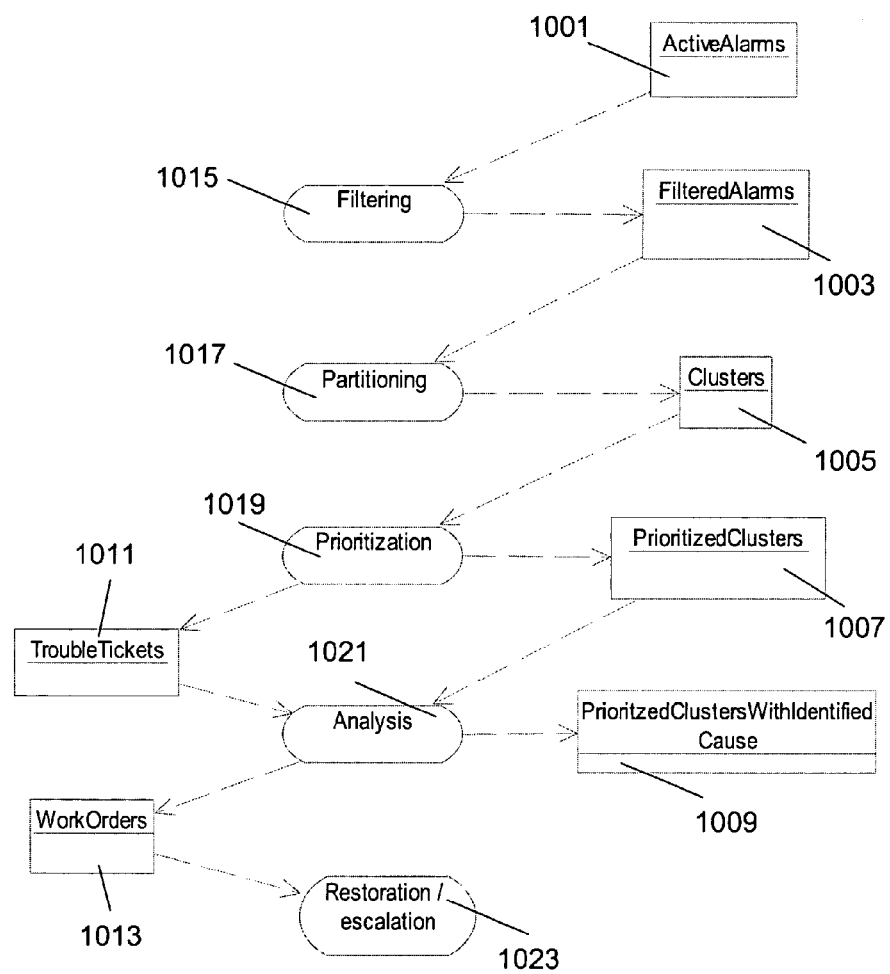
FIG. 10 shows a management workflow.

FIG. 10 shows a fault, i.e. incident, management workflow organizing a set of activities according to the principles described herein. The workflow uses UML notation, wherein a rectangle element with rounded corners depicts an activity, a rectangle depicts an object which may be used to diagram an input and an output relationship between activities. A dashed arrow depicts an object flow and represents a relationship between an activity and an object that creates the activity as an output or uses an activity as an input. The objects may comprise one of the following: active alarms 1001, filtered alarms 1003, clusters 1005, prioritized clusters 1007 and prioritized clusters without identified cause 1009, trouble tickets 1011 and work orders 1013. The activities may comprise filtering 1015, partitioning 1017, prioritizing 1019, analyzing 1021 and restoring or escalating 1023. The following table summarizes some embodiments of the activities shown in FIG. 10 with regard to the 3GPP TSG-SA5 specification are summarized.

| Activity | Description |
|---|---|
| Filtering 1015 | The high volume of ActiveAlarms, typically the ones received by an IRPManager via the getAlarmList can inhibit the operator ability to quickly identify and locate the responsible network faults. The Advanced Alarm Management IRP provides methods to reduce (filter) the volume based on operator specified Rules. The output of this activity is filtered alarms (FilteredAlarms). |
| Partitioning 1017 | This activity correlates and partitions the FilteredAlarms, based on certain rules (or information), such as alarm propagation paths, alarm source locations, alarm raised time information, correlatedNotification information into sets where alarms within one set have a high probability of being caused by the same network fault. The output of this activity is a set of Clusters where each Cluster contains a set of FilteredAlarms. |
| Prioritization 1019 | This activity prioritizes (in terms of restoration/repair urgency) the Clusters, based on certain rules (or information) such as: Types of service in alarmed state (e.g., services crucial to network operation receives highest priority, VPN and data services has lower priority while traditional Internet service provider (ISP) service has the lowest). The output of this activity is a set of Clusters with priority designation. Trouble tickets can now be issued. Priority levels can be: Major Service Outage, Critical, Major, Medium, Minor and Non-Service-Affecting Failure. |
| Analyzing 1021 | This activity analyzes and identifies the network fault causing the alarms identified in the Cluster. Inputs, such as past network fault patterns, operator experience in recognizing root causes, are needed to identify the root cause. The outputs of this activity are Clusters with priority level and root cause. Work order, containing information of Cluster, its priority level and root cause, can now be issued. RCA is a process within this activity. |
| Restoring/ escalating 1023 | This activity corrects the network fault and restores services impacted by the network fault. This activity closes the related Trouble ticket if restoration is successful. Otherwise, it relays (escalates) the still opened. Trouble Ticket to say, the back-office, for further processing. |

Some embodiments may simplify the prioritization of the incident or alarms since an operator does not may to have any knowledge on the alarm generated by the network element which may define its severity judgment. Furthermore, a domain manager does not may to implement knowledge about internal structure or functionality of a network element. Furthermore, the judgment of the incident or group of alarms may be performed automatically without any interaction by a user.

The invention claimed is:

1. A method, in a domain manager in a communication network, for determining a severity of a network incident causing a network alarm in the communication network, the method comprising:
    obtaining, in the domain manager, a severity attribute associated with the network alarm, the severity attribute indicating an impact of the network incident on a communication service in the communication network, wherein said obtaining the severity attribute comprises receiving the network alarm together with the severity attribute over the communication network; and
    relating, in the domain manager, the severity attribute to a severity indicator from a predetermined set of severity indicators to determine the severity of the network incident.

2. The method of claim 1, wherein the severity attribute indicates at least one of:
    a number of subscribers affected by the network incident,
    a type of a subscriber affected by the network incident, a number of network cells affected by the network incident, a number of communication sites affected by the network incident, a communication service, in particular a voice service or a packet data service, affected by the network incident, a degradation of a communication service, in particular of a voice service or of a packet data service, due to the network incident, an importance of a communication service affected by the network incident, a type of a communication service affected by the network incident, a duration of a disturbance caused by the network incident, a duration of the network incident, a remaining time until an occurrence of a disturbance caused by the network incident, and a remaining number of redundant communication resources which are available until an occurrence of a disturbance caused by the network incident.

3. The method of claim 1, wherein the predetermined set of severity indicators comprises at least one of the following severity indicators:

major service outage, critical, major, minor, and non service affecting.

4. The method of claim 1, wherein the network incident causes a number of correlated network alarms, the method further comprising:

correlating a plurality of network alarms with respect to the network incident to determine the number of correlated network alarms;

obtaining a number of severity attributes for the number of network alarms; and relating the number of severity attributes to at least one severity indicator from the predetermined set of severity indicators to determine the severity of the network incident.

5. The method of claim 4, wherein relating the number of severity attributes to the at least one severity indicator comprises:

accumulating the number of severity attributes and relating the accumulated number of severity attributes to the at least one severity indicator; or relating a maximum severity attribute among the number of the severity attributes to the at least one severity indicator.

6. A method, in a domain manager in a communication network, for determining a severity of a network incident causing a network alarm in a communication network, the method comprising:

obtaining, in the domain manager, a severity attribute associated with the network alarm, the severity attribute indicating an impact of the network incident on a communication service in the communication network, wherein obtaining the severity attribute comprises receiving network information relating to an impact of the network alarm on the communication service, in particular a network alarm type, the network information enabling to determine the severity attribute, and determining the severity attribute upon the basis of the received network information; and relating, in the domain manager, the severity attribute to a severity indicator from a predetermined set of severity indicators to determine the severity of the network incident.

7. The method of claim 6, wherein the severity attribute indicates at least one of:

a number of subscribers affected by the network incident, a type of a subscriber affected by the network incident, a number of network cells affected by the network incident, a number of communication sites affected by the network incident, a communication service, in particular a voice service or a packet data service, affected by the network incident, a degradation of a communication service, in particular of a voice service or of a packet data service, due to the network incident, an importance of a communication service affected by the network incident, a type of a communication service affected by the network incident, a duration of a disturbance caused by the network incident, a duration of the network incident, a remaining time until an occurrence of a disturbance caused by the network incident, and a remaining number of redundant communication resources which are available until an occurrence of a disturbance caused by the network incident.

8. The method of claim 6, wherein the predetermined set of severity indicators comprises at least one of the following severity indicators:

major service outage, critical, major, minor, and non service affecting.

9. The method of claim 6, wherein the network incident causes a number of correlated network alarms, the method further comprising:

correlating a plurality of network alarms with respect to the network incident to determine the number of correlated network alarms;

obtaining a number of severity attributes for the number of network alarms; and relating the number of severity attributes to at least one severity indicator from the predetermined set of severity indicators to determine the severity of the network incident.

10. The method of claim 9, wherein relating the number of severity attributes to the at least one severity indicator comprises:

accumulating the number of severity attributes and relating the accumulated number of severity attributes to the at least one severity indicator; or relating a maximum severity attribute among the number of the severity attributes to the at least one severity indicator.

11. A method, in a network node apparatus, for characterizing a network incident indicated by a network alarm in a communication network, the method comprising:

obtaining, in the network node apparatus, network information relating to an impact of the network alarm on a communication service to characterize the network incident; and transmitting the network information over the communication network.

12. The method of claim 11, wherein the network information indicates a network alarm type enabling the determining of a severity attribute, the severity attribute characterizing the network incident.

13. The method of claim 11, wherein the network information is transmitted together with the network alarm towards a domain manager in the communication network.

14. The method of claim 11, wherein the network incident causes a number of correlated network alarms, the method further comprising:
    correlating network alarms to determine the number of correlated network alarms;
    analyzing an impact of the network incident as indicated by the number of correlated network alarms on the communication service, to obtain a number of severity attributes; and
    associating the number of correlated network alarms with a severity indicator.

15. A domain manager apparatus configured to determine a severity of a network incident causing one or several network alarms in a communication network, the domain manager apparatus comprising:
    a receiver adapted to receive a network alarm and a severity attribute associated with the network alarm, the severity attribute indicating an impact of the network incident on a communication service in the communication network; and
    a processor adapted to relate the severity attribute to a severity indicator from a predetermined set of severity indicators to determine the severity of the network incident.

16. A domain manager apparatus configured to determine a severity of a network incident causing one or several network alarms in a communication network, the domain manager apparatus comprising:
    a receiver adapted to receive network information relating to an impact of the network alarm or alarms on the communication service, said network information comprising a network alarm type and enabling the determining of a severity attribute, the severity attribute indicating an impact of the network incident on a communication service in the communication network, and
    a processor for determining the severity attribute, based upon the received network information.

17. A network node apparatus adapted to characterize a network incident indicated by a network alarm in a communication network, the network node apparatus comprising:
    a processor adapted to obtain network information relating to an impact of the network alarm on a communication service to characterize the network incident; and
    a transmitter adapted to transmit the network information over the communication network.

18. The network node apparatus of claim 17, wherein the network node apparatus is a radio network controller or a base station.

19. The network node apparatus of claim 17, wherein the processor is adapted to analyze an impact of the network incident as indicated by the network alarm on a communication service to obtain a severity attribute.

20. The network node apparatus of claim 17, wherein the transmitter is adapted to transmit the network alarm together with the severity attribute associated therewith towards a domain manager in the communication network.

* * * * *